(12) United States Patent
Kim

(10) Patent No.: US 6,661,855 B2
(45) Date of Patent: *Dec. 9, 2003

(54) CIRCUIT FOR DISCRIMINATING BETWEEN RECEIVED SIGNALS AND METHOD THEREFOR

(75) Inventor: Ki-bum Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/185,041

(22) Filed: Jul. 1, 2002

(65) Prior Publication Data

US 2002/0168036 A1 Nov. 14, 2002

Related U.S. Application Data

(63) Continuation of application No. 09/212,486, filed on Dec. 16, 1998, now Pat. No. 6,519,298.

(51) Int. Cl.[7] .............. H04N 5/44; H04N 5/10
(52) U.S. Cl. ............ 375/343; 348/526; 348/725
(58) Field of Search .................. 375/343, 367; 370/515; 348/471, 472, 469, 500, 526, 558, 725, 726

(56) References Cited

U.S. PATENT DOCUMENTS 5,619,269 A   4/1997  Lee et al.
5,684,827 A   11/1997 Nielsen
5,877,816 A * 3/1999  Kim ..................... 348/526
5,886,748 A   3/1999  Lee
5,955,618 A   9/1999  Kim
6,118,495 A   9/2000  Limberg et al.
6,298,100 B1 * 10/2001 Bouillet ................. 375/326
6,335,762 B1 * 1/2002  Lee ..................... 348/558
6,504,578 B1 * 1/2003  Gu ...................... 348/521
2001/0007480 A1 * 7/2001 Hong et al.
2002/0145680 A1 * 10/2002 Hong

* cited by examiner

Primary Examiner—Young T. Tse
(74) Attorney, Agent, or Firm—Sughrue Mion, PLLC

(57) ABSTRACT

A circuit for discriminating between received signals and a method therefor are provided. The circuit includes a detector for detecting a peak signal based on the degree of correlation between a received signal and a reference signal and a generator for generating a discrimination signal showing that the received signal is a high definition signal if the peak signal is detected in a predetermined period and showing that the received signal is a signal of an analog broadcasting method if the peak signal is not detected in the predetermined period. This can prevent the improper operation of a receiver by automatically determining whether the received signal according to a channel selection is a high definition digital signal or an analog broadcast signal.

14 Claims, 4 Drawing Sheets

CIRCUIT FOR DISCRIMINATING BETWEEN RECEIVED SIGNALS AND METHOD THEREFOR

This is a Continuation Application of application Ser. No. 09/212,486 filed on Dec. 16, 1998, now U.S. Pat. No. 6,519,298B1, the disclosure of which is incorporated herein by reference.

BACKGROUND OF THE INVENTION

1. Field of the Invention

The present invention relates to the field of reception, and more particularly, to a circuit for determining whether a received signal is a high definition signal or an analog broadcast signal.

2. Description of the Related Art

Recently, in the United States, a test of a "Grand Alliance" (GA) advanced television (ATV) system which is a digital television transmission system has been completed as a new television standard which can replace a conventional analog NTSC. The GA-ATV system, standardized by an advanced television system committee (ATSC) (GA-HDTV or GA-VSB), employs a vestigial side band (VSB) modulation method which is a digital transmission method.

However, even with the start of HDTV broadcasts, the conventional NTSC cannot help but coexist. A receiver must have a structure in which it is possible to simultaneously watch the HDTV broadcasts and the NTSC TV broadcasts. Namely, since the same channel can be broadcast in either NTSC TV or HDTV, depending on the area, a structure in which it is possible to watch the two types of broadcasts is necessary. In general, a simulcast receiver which receives an HDTV signal and an NTSC TV signal can be comprised of a tuner, an HDTV signal processor and an NTSC TV signal processor for separately processing the HDTV signal and the NTSC TV signal, and a display. Therefore, in order to display either the HDTV signal or the NTSC TV signal using a single display, it is necessary to determine whether the currently received signal is a HDTV signal or a NTSC TV signal. Also, in order to display whether the channel selected by the user is the HDTV channel or the NTSC TV channel in the receiver receiving the HDTV signal, a circuit for determining whether the currently selected signal is the HDTV signal or the NTSC TV signal is necessary. cl SUMMARY OF THE INVENTION It is an object of the present invention to provide a circuit for determining whether a received signal is a high definition digital signal or an analog broadcasting signal.

It is another object of the present invention to provide a method of determining whether a received signal is a high definition digital signal or an analog broadcast signal.

To achieve the first object, a detector of a circuit for discriminating between received signals detects a peak signal based on a degree of correlation between a received signal and a reference signal. A generator shows that the received signal is a high definition signal having a predetermined digital signal format if the peak signal is detected in a predetermined period and shows that the received signal is a signal of an analog broadcast method if the peak signal is not detected in the predetermined time.

To achieve the second object, there is provided a method for discriminating whether a received signal is a high definition signal having a digital format or a signal of an analog broadcast method, comprising the steps of detecting a peak signal based on a degree of correlation between a received signal and a reference signal and generating a discrimination signal showing that the received signal is a high definition signal if the peak signal is generated in a predetermined period and showing that the received signal is a signal of an analog broadcast method if the peak signal is not detected in the predetermined period.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Hereinafter, a circuit for discriminating between different types of received signals according to the present invention and a method therefor will be described with reference to the attached drawings.

Figure 1:
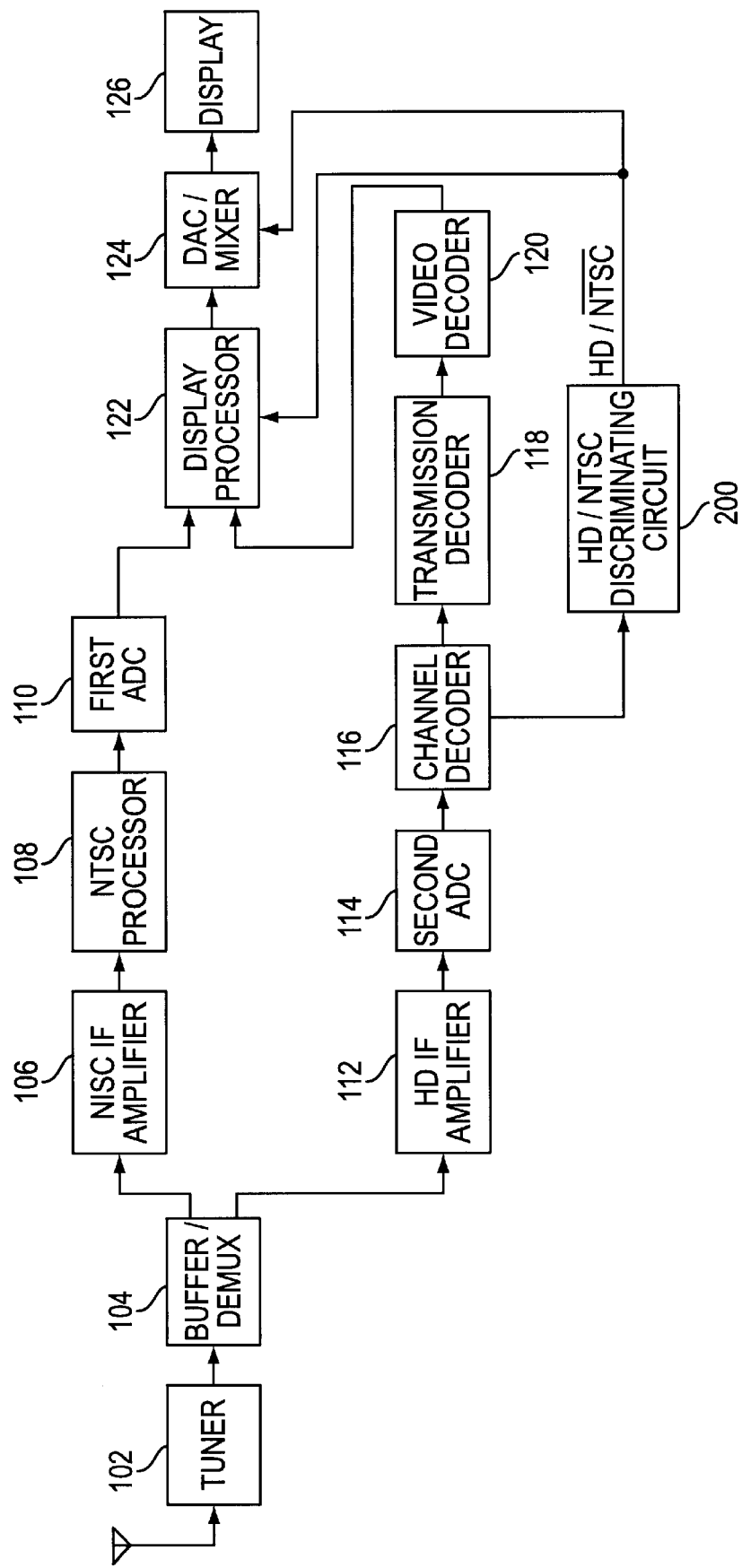
FIG. 1 is a block diagram showing an HD/NTSC simulcast receiver to which the present invention is applied.

In FIG. 1, a tuner 102 simultaneously receives an HDTV signal and an NTSC TV signal. In a buffer/demultiplexer 104, the HDTV signal or the NTSC TV signal provided through the tuner 102 is temporarily stored in the buffer, demultiplexed by the demultiplexer, and is provided to an NTSC intermediate frequency (IF) amplifier 106 and an HD IF amplifier 112.

The NTSC IF amplifier 106 amplifies an NTSC IF signal provided from the buffer/demultiplexer 104. The NTSC processor 108 demodulates the amplified NTSC IF signal to a baseband signal. A first analog-to-digital converter (ADC) 110 converts the demodulated analog NTSC signal into digital data and provides the result to a first input port of a display processor 122.

The HD IF amplifier 112 amplifies the HD IF signal provided from the buffer/demultiplexer 104. A second ADC 114 converts the amplified HD IF signal into the digital data. A channel decoder 116 demodulates the HD IF signal converted into the digital data to the baseband signal, restores a segment synchronizing signal and a symbol clock from the data demodulated to the baseband signal and provides the restored segment synchronizing signal and symbol clock to an HD/NTSC discriminating circuit 200. The demodulated HD signal is in the form of a transport packet. Therefore, a transmission decoder 118 analyses a transport packet header from the transport packet and divides the transport packet into a video stream and an audio stream based on the analyzed packet identification (PID). A video decoder 120 decodes the video data from the video stream.

The HD/NTSC discriminating circuit 200 determines whether the received signal is the HDTV signal or the NTSC TV signal using the segment synchronizing signal and the symbol clock provided from the channel decoder 116 and provides a discriminating signal HD/NTSC. A display processor 122 selects either the NTSC TV signal provided from a first ADC 110 or the HDTV signal provided from the video decoder 120 according to the discriminating signal HD/NTSC, processes the selected signal as a signal suitable to be displayed, and provides the processed signal to a digital-to-analog converter (DAC)/mixer 124.

The DAC/mixer 124 converts the data processed by the display processor 122 into an analog image signal, generates an on screen display (OSD) signal as an example of caption information displaying whether the currently received channel is a HDTV channel or a NTSC TV channel based on the discriminating signal HD/NTSC provided by the HD/NTSC discriminating circuit 200, mixes the generated OSD signal with the analog image signal, and displays the mixed signal through a display 126. The caption information can be an on screen graphic (OSG) signal.

Here, a structure obtained by omitting parts from the buffer/DEMUX 104 to the first ADC 110 from the simulcast receiver shown in FIG. 1 can be the structure of a receiver for receiving only an HDTV signal.

Figure 2:
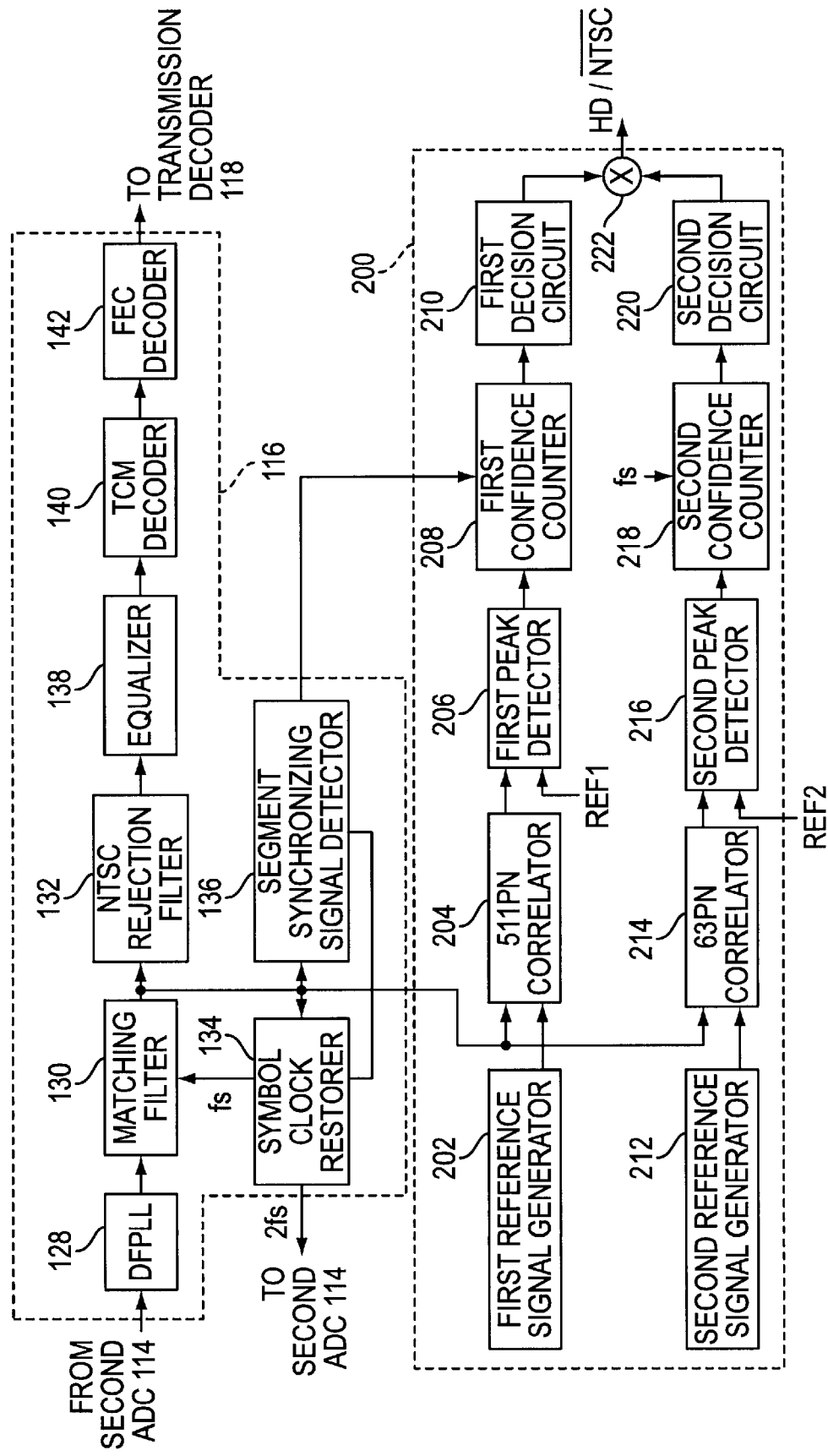
FIG. 2 is a detailed block diagram showing a channel decoder and an HD/NTSC discriminating circuit, shown in FIG. 1.

FIG. 2 is a detailed block diagram of the channel decoder 116 and the discriminating circuit 200 shown in FIG. 1. In FIG. 2, a digital frequency phase locked loop (DFPLL) circuit 128 of the channel decoder 116 restores a carrier wave using a pilot signal included in the data provided from the second ADC 114, and demodulates the restored carrier wave into the baseband signal.

A matching filter 130 controls the symbol rate of the data provided from the DFPLL circuit 128 in order to remove signal distortion and aliasing from the demodulated baseband signal. Namely, the matching filter 130 controls the symbol rate 2 fs of the data provided from the DFPLL circuit 128 to be a symbol clock fs.

An NTSC rejection filter 132 removes the component of the NTSC TV signal included in the HDTV signal provided by the matching filter 130 since the NTSC TV signal operates as an interference when the NTSC TV signal coexists in the HDTV channel.

A symbol clock restorer 134 restores the symbol clock in response to the output of the matching filter 130 and the segment synchronizing signal provided from the segment synchronizing signal detector 136 and applies a sampling clock having a frequency 2 fs two times larger than that of the symbol clock to the second ADC 114 shown in FIG. 1. The symbol clock fs restored by the symbol clock restorer 134 is provided to other blocks for processing the digital signal though not shown in the drawings as well as the matching filter 130 and the HD/NTSC discriminating circuit 200.

The segment synchronizing signal detector 136 detects the segment synchronizing signal from the output of the matching filter 130. Namely, the segment synchronizing signal detector 136 inputs the data controlled to have the symbol rate fs provided from the matching filter 130, obtains correlation values in units of four symbols, accumulates the obtained correlation values in units of a segment, and generates the segment synchronizing signal in a position in which a maximum accumulated correlation value is detected in every data segment since the accumulated correlation value of each segment has the maximum value during four segment synchronizing symbol sections.

An equalizer 138 updates and equalizes coefficients of a filter in the equalizer using a known sequence inserted in the field synchronizing segment in order to remove a multipath distortion passing through the transmission channel.

A Trellis-coded modulation (TCM) decoder 140 Trellis-decodes the output of the equalizer 138. A forward error correction (FEC) decoder 142 de-interleaves the Trellis decoded data, error-correction-decodes and de-randomizes the de-interleaved data, and provides the data to the transmission decoder 118 shown in FIG. 1.

A first input port of a 511 pseudo number (PN) correlator 204 of the HD/NTSC discriminating circuit 200 provided by the present invention is connected to the output port of the matching filter 130. A second input port thereof is connected to the output port of a first reference signal generator 202. A first input port of a 63PN correlator 214 is connected to the output port of the matching filter 130. A second input port thereof is connected to a second reference signal generator 212.

A first input port of a first peak detector 206 is connected to the output port of the 511PN correlator 204. A first reference value REF1 is input to a second input port thereof. A first input port of a second peak detector 216 is connected to the output port of the 63PN correlator 214. A second reference value REF2 is input to a second input port thereof. An enable port of a first confidence counter 208 is connected to the output port of the first peak detector 206. A clock port thereof is connected to the output port of the segment synchronizing signal detector 136. An output port thereof is connected to a first decision circuit 210. An enable port of a second confidence counter 218 is connected to the output port of the second peak detector 216. A clock port thereof is connected to the output port of the symbol clock restorer 134. An output port thereof is connected to the output port of a second decision circuit 220. A discrimination signal generator 222 can be comprised of a multiplier or an AND gate. First and second input ports thereof are respectively connected to the output ports of the first and second decision circuits 210. An output port thereof is connected to each control port of the display processor 122 and the DAC/mixer 124.

Figure 3:
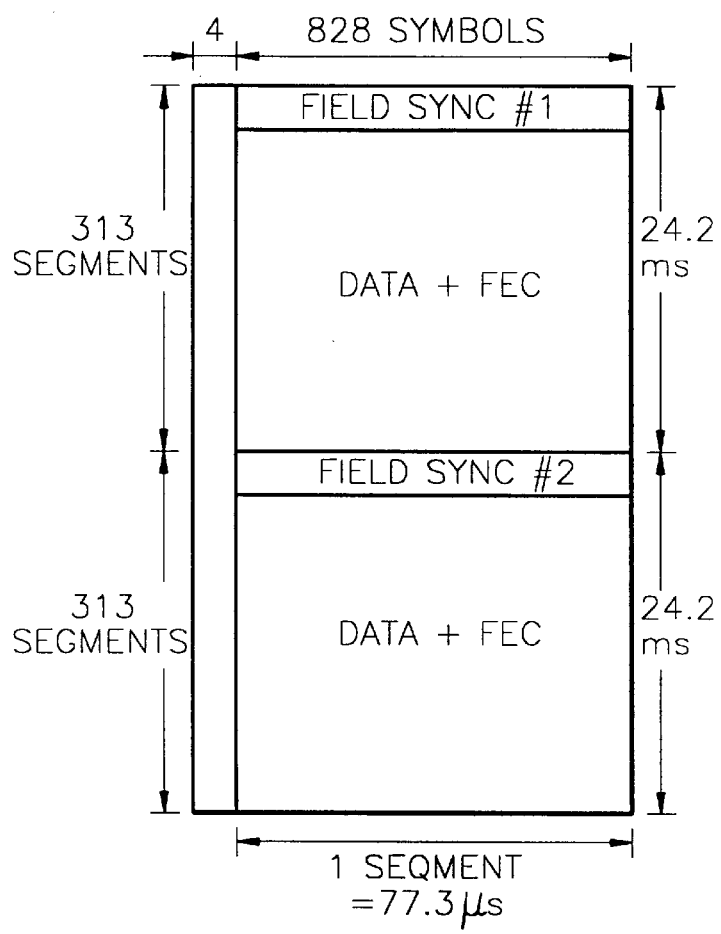
FIG. 3 illustrates a VSB transmission frame format.
Figure 4:
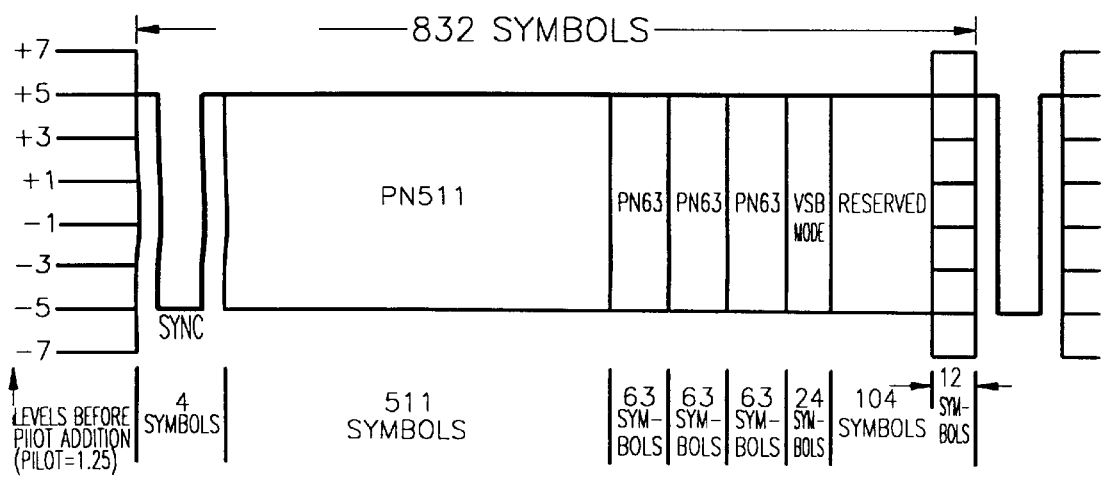
FIG. 4 is a representation of a field synchronizing signal sequence of a field synchronizing segment shown in FIG. 3.

The operation of the HD/NTSC discriminating circuit 200 will be described with reference to FIGS. 3 and 4. In FIG. 3, the HDTV signal provided from the matching filter 130, i.e., the VSB data is input to each first input port of the 511PN correlator 204 and the 63PN correlator 214.

Here, a VSB data frame is comprised of two fields as shown in FIG. 3. Each field is comprised of one field synchronizing segment and 312 data segments. Each data segment is comprised of the segment synchronizing signal of four symbols and 828 data symbols. The segment synchronizing signal is inserted into a digital data stream having 8 levels in the front of the field synchronizing segment and each data segment. The segment synchronizing signal has a uniform pattern in which four symbols have a signal level of "+5, −5, −5, and +5". The remaining data of the data segment are randomly comprised of an arbitrary signal level among eight levels (±1, ±3, ±5, and ±7).

Field synchronizing signal sequences FIELD SYNC #1 and FIELD SYNC #2 showing the beginning of fields are inserted into field synchronizing segments which are the first segments of the respective fields. Namely, as shown in FIG. 4, the field synchronizing segment is comprised of 832 symbols. The segment synchronizing signal is positioned in the first four symbols. A 511 pseudo number (511PN) is positioned in the next 511 symbols. Three 63PNs are positioned in the next 189 symbols. The additional information is provided for the remaining 128 symbols. Here, since the 511PN is a predetermined signal sequence represented by the +5 and −5 level, it is used in a signal processing block using a known sequence such as equalization. In the second 63PN among the three 63PN, phases are inverted alternately in every field. The field synchronizing signal sequence showing the beginning of the field having the format shown in FIG. 4 is inserted into the first segment of every field. The field synchronizing signal sequence always has a uniform pattern.

The first reference signal generator 202 generates a pseudo random number in which the length of a reference signal is 511 (a 511 PN reference signal). Namely, the first reference signal generator 202 locally and repeatedly generates the same signal as the 511 PN included in the field synchronizing signal sequence shown in FIG. 3. The second reference signal generator 212 generates a pseudo random number in which the length of a reference signal is 63 (a 63PN reference signal). Namely, the second reference signal generator locally and repeatedly generates the same signal as the 63PN included in the field synchronizing signal sequence. In the present invention, the first reference signal generator 202 and the second reference signal generator 212 are separately constructed in order to facilitate description. However, the 511 PN reference signal and the 63PN reference signal may be generated from single reference signal generator.

The 511 PN reference signal and the 63PN reference signal generated from the first reference signal generator 202 and the second reference signal generator 212 are respectively provided to the second input ports of the 511 PN correlator 204 and the 63PN correlator 214. Therefore, the 511 PN correlator 204 obtains the correlation value of the 511 PN by accumulating the correlation values of between the VSB data and the 511 PN reference signal in units of the 511 symbol. The first peak detector 206 detects whether the correlation value of the 511 PN provided from the 511 PN correlator 204 is no less than the first reference value REF1 and provides the first peak signal. The first peak signal is detected in each field.

The 63PN correlator 212 obtains the correlation value of the 63PN by accumulating the correlation values of between the VSB data and the 63PN reference signal in units of 63 symbols. The second peak detector 216 detects whether the correlation value of the 63PN provided from the 63PN correlator 212 is no less than the second reference value REF2 and provides the second peak signal. The second peak signal is alternately detected in every field two or three times. This is because phases are inverted alternately in every field in the second 63PN among the three 63PNs.

At this time, the peak value is shown where the 511 PN signal and the 63PN signal included 20 in the field synchronizing signal sequence are positioned and a value of almost "0', in places other than the field synchronizing signal sequence. Here, in order to simplify hardware, the 511PN correlator 204 and the 63PN correlator 214 can respectively detect the correlation value of the 511 PN reference signal and the 63 PN reference signal, respectively.

The first confidence counter 208 verifies the confidence of the peak value detected by the first peak detector 206 using the segment synchronizing signal provided by the segment synchronizing signal detector 136. In the case of the HDTV signal, the first peak signal is provided by the first peak detector 206 whenever the segment synchronizing signal is generated 313 times. Therefore, the first confidence counter 208 receives the first peak signal as an enable signal when the first peak signal is detected by the first peak detector 206 and counts the segment synchronizing signal generated by the segment synchronizing signal detector 136. The first confidence counter 208 counts the 313 segment synchronizing signals and provides a logic "high" signal to the first decision circuit 210 when the first peak signal is provided from the first peak detector 206. The second confidence counter 218 verifies the confidence of the peak value detected by the second peak detector 216. In the case of the HDTV signal, as shown in FIG. 4, the two second peak signals with respect to the first and third 63PNs among the continuous three 63PNs are provided by the second peak detector 216 in every field. Therefore, the second confidence counter 218 receives the beginning second peak signal of the second peak detector 216 as an enable signal, counts 126 symbol clocks generated by the symbol clock restorer 134, and provides the logic "high" signal to the second decision circuit 220 when the next second peak signal is input. Here, a distance between the first symbol of the first 63PN to the first symbol of the third 63PN is 126 symbols.

The first and second decision circuits 210 and 220 determine the logic "high" signals continuously provided a predetermined number of times by the first and second confidence counters 208 and 218 to be the HDTV signals and provide the first and second decision signals of the logic "high". Namely, the first and second decision circuits 210 and 220 observe the output signals of the first and second confidence counters 208 and 218 for a certain time, determine whether periodicity exists, and determine whether the output signals are the HDTV signals or the NTSC TV signals. In the case of the HDTV signal, there is continuous periodicity.

The multiplier of the discriminating signal generator 222 multiplies the output of the first decision circuit 210 by the output of the second decision circuit 220 and provides the discrimination signal HD/NTSC. Namely, the discrimination signal generator 222 provides a discrimination signal of logic "high" showing that the output signals are the HDTV signals when periodicity is detected simultaneously in both the first and second decision circuits 210 and 220. When there is no periodicity in either of the two circuits 210 and 220, a discrimination signal of logic "low" showing that the output signals are the NTSC TV signal is provided.

Figure 5:
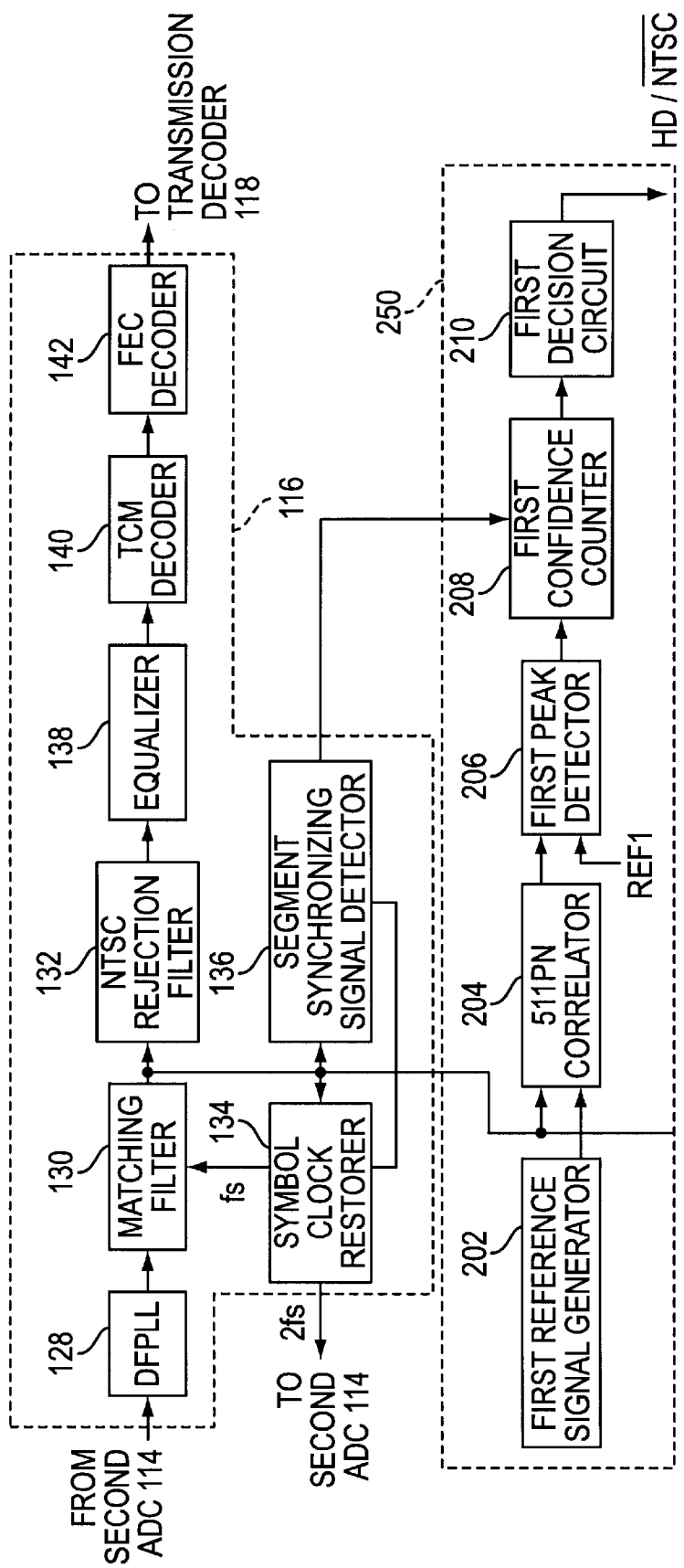
FIG. 5 is a detailed block diagram showing a channel decoder and an HD/NTSC discriminating circuit, shown in FIG. 1, in which discrimination is performed with respect to only one channel.

In FIG. 2, two channels exist for the confidence of the discrimination circuit. However, one channel may exist, as shown in FIG. 5. The configuration shown in FIG. 5 is similar to that shown in FIG. 2, except the HD/NTSC discriminating circuit 250 of FIG. 5 has one channel for discriminating between HD and NTSC signals, while the FIG. 2 discriminating circuit 200 has two channels for discriminating between HD and NTSC signals. Also, the present invention can be applied to a receiver for receiving a digital terrestrial wave HDTV signal to be broadcast as well as the simulcast receiver which can simultaneously receive the NTSC TV signal and the HDTV signal. Namely, in the HDTV receiver, the channel selected by a user indicating whether the selected channel is a HDTV channel or a NTSC channel is displayed by a caption information according to the HD/NTSC discrimination signal. In the present invention, the NTSC TV signal and the HDTV signal of a VSB modulation method are respectively described as an example of the signal of the analog broadcasting method and an example of the high definition signal. A standard definition (SD) signal can be included in the high definition signal.

As mentioned above, according to the present invention, it is possible to prevent improper operation of the receiver since the received signal according to channel selection is the high definition signal or the signal of the analog broadcast method, thus meeting the needs of consumers.

What is claimed is:

1. A circuit for discriminating between received signals, comprising:

a correlator for obtaining a correlation degree between a received high definition signal and a reference signal and providing a correlation value;

a peak detector for providing a peak signal when the correlation value is larger than a reference value; and means for generating a discrimination signal for showing that the received signal is a high definition signal having a predetermined digital signal format if the peak signal is detected in a predetermined period and showing that the received signal is a signal of an analog broadcast format if the peak signal is not detected in the predetermined period.

2. The circuit of claim 1, wherein the correlator detects said correlation degree between a sign bit of said received high definition signal and said reference signal.

3. The circuit of claim 1, wherein the reference signal is in the same signal sequence as a 511 pseudo number (PN) of a field synchronizing signal sequence of a VSB signal.

4. The circuit of claim 3, wherein the generating means generates the discrimination signal showing that the received signal is said high definition signal when the peak signal is continuously provided a predetermined number of times from the peak detector in a field period.

5. The circuit of claim 1, wherein the reference signal is in the same signal sequence as a 63PN of a field synchronizing signal sequence of a VSB signal.

6. The circuit of claim 5, wherein the generating means generates said discrimination signal showing that the received signal is said high definition signal when the peak signal is provided from the peak detector for detecting a peak period by a distance of a predetermined symbol and when the peak signal generated by the distance of the predetermined symbol is continuously provided a predetermined number of times in a field period.

7. The circuit of claim 1, wherein the circuit is part of a simulcast receiver, the simulcast receiver comprising:

a tuner for receiving said high definition signal having the predetermined digital signal format and the signal of the analog broadcast format;

a first processing portion for demodulating said high definition signal provided from the tuner to a baseband signal and detecting a segment synchronizing signal and a symbol clock from a demodulated signal;

a second processing portion for demodulating the signal of the analog broadcast format provided from the tuner to a baseband signal; an a display for selecting either the output signal of the first processing portion or the output signal of the second processing portion according to the discrimination signal and processing the selected output signal to a signal suitable for displaying.

8. The circuit of claim 1, wherein the circuit is part of a high definition receiver, the high definition receiver, comprising:

a tuner for receiving said high definition signal having the predetermined digital signal format;

a channel decoder for demodulating said received high definition signal to a baseband signal and detecting a segment synchronizing signal and a symbol clock from a demodulated signal; and a display processor for displaying whether the channel selected by a user is a high definition TV channel or a TV channel of the analog broadcast format as a caption data according to the discrimination signal.

9. A method for discriminating whether a received signal is a high definition signal having a digital format or a signal having an analog broadcast format, comprising the steps of:

(a) providing a correlation value by obtaining a correlation degree between the received signal and a reference signal;

(b) providing a detection signal when the correlation value is larger than a reference value; and (c) generating a discrimination signal showing that the received signal is the high definition signal if the detection signal is generated in a predetermined period and showing that the received signal is the signal of the analog broadcast format if the detection signal is not generated in the predetermined period.

10. The method of claim 9, wherein the step (a) comprises obtaining the correlation degree between a sign bit of the received high definition signal and the reference signal.

11. The method of claim 9, wherein the reference signal is in the same signal sequence as a 511 PN of a field synchronizing signal sequence of a VSB signal.

12. The method of claim 11, wherein the discrimination signal showing that the received signal is the high definition signal when the detection signal is continuously provided a predetermined number of times in a field period in the step (b) is generated in the step (c).

13. The method of claim 9, wherein the reference signal is in the same signal sequence as a 63PN of a field synchronizing signal sequence of a VSB signal.

14. The method of claim 13, wherein the discrimination signal showing that the received signal is the high definition signal when the detection signal is generated by a distance of a predetermined symbol and when the detection signal generated by the distance of the predetermined symbol is provided a predetermined number of times in a field period in the step (b) is generated in the step (c).

* * * * *